United States Patent
Ivanov et al.

(10) Patent No.: US 10,893,377 B2
(45) Date of Patent: Jan. 12, 2021

(54) DETERMINING A POSITION ESTIMATE OF A MOBILE DEVICE BASED ON LAYOUT INFORMATION

(71) Applicant: HERE Global B.V., Eindhoven (NL)

(72) Inventors: Pavel Ivanov, Tampere (FI); Tatiana Vyunova, Tampere (FI)

(73) Assignee: HERE GLOBAL B.V., Eindhoven (NL)

( * ) Notice: Subject to any disclaimer, the term of this patent is extended or adjusted under 35 U.S.C. 154(b) by 0 days.

(21) Appl. No.: 16/368,063

(22) Filed: Mar. 28, 2019

(65) Prior Publication Data
US 2020/0314584 A1    Oct. 1, 2020

(51) Int. Cl.
| H04W 24/00 | (2009.01) |
| H04W 4/021 | (2018.01) |
| H04W 4/029 | (2018.01) |
| H04W 4/80  | (2018.01) |
| H04W 84/12 | (2009.01) |

(52) U.S. Cl.
CPC .......... *H04W 4/021* (2013.01); *H04W 4/029* (2018.02); *H04W 4/80* (2018.02); *H04W 84/12* (2013.01)

(58) Field of Classification Search
CPC ....... H04W 4/021; H04W 4/80; H04W 4/029; H04W 84/12
USPC ..................................................... 455/456.1
See application file for complete search history.

(56) References Cited

U.S. PATENT DOCUMENTS

| 8,538,442 | B1  | 9/2013 | Ettinger et al. | |
| 8,849,308 | B2* | 9/2014 | Marti ..................... | G01S 5/0252 455/456.2 |
| 8,983,489 | B2  | 3/2015 | Prost et al. | |
| 9,037,160 | B2  | 5/2015 | Jones et al. | |
| 9,361,633 | B1  | 6/2016 | Thiagarajan et al. | |
| 2008/0032703 | A1* | 2/2008 | Krumm ................. | H04W 4/029 455/456.1 |

(Continued)

FOREIGN PATENT DOCUMENTS

| WO | WO 2014/099972 A2 | 6/2014 |
| WO | WO 2015/009498 A1 | 1/2015 |
| WO | WO 2019/052653 A1 | 3/2019 |

OTHER PUBLICATIONS

Seneviratne, S. et al., *SSIDs in the Wild: Extracting Semantic Information From WiFi SSIDS*, [online] [retrieved May 7, 2019]. Retrieved from the Internet: <URL: https://hal.inria.fr/hal-01181254/document>. (dated Jul. 29, 2015) 4 pages.

(Continued)

*Primary Examiner* — Amancio Gonzalez
(74) *Attorney, Agent, or Firm* — Alston & Bird LLP

(57) ABSTRACT

A method is disclosed that is performed by a mobile device and that includes receiving at least one radio signal when scanning for observable radio signals at an observation position of the mobile device; determining or causing determining a venue associated with an identifier contained in or represented by the at least one radio signal at least partially based on a plurality of venue information items; and determining or causing determining a position estimate of the observation position at least partially based on layout information representing a layout of the venue associated with the identifier. A corresponding apparatus and non-transitory computer readable storage medium are also disclosed.

20 Claims, 5 Drawing Sheets

(56) References Cited

U.S. PATENT DOCUMENTS

| | | |
|---|---|---|
| 2015/0248436 A1 | 9/2015 | Podemsky et al. |
| 2015/0339694 A1* | 11/2015 | Robbin .............. G06Q 30/0207 |
| | | 705/14.1 |
| 2016/0019257 A1 | 1/2016 | Wither |
| 2016/0234652 A1* | 8/2016 | Chao .................... H04W 4/025 |
| 2018/0041867 A1 | 2/2018 | Wang et al. |

OTHER PUBLICATIONS

Stook, J., *Planning an Indoor Navigation Service for a Smartphone With Wi-Fi Fingerprinting Localization*, [online] [retrieved May 7, 2019]. Retrieved from the Internet: <URL: https://dspace.ibrary.uu.nl/handle/1874/234909>. (dated Aug. 2011) 145 pages.

Extended European Search Report for Application No. 20165242.7 dated Sep. 2, 2020, 7 pages.

\* cited by examiner

DETERMINING A POSITION ESTIMATE OF A MOBILE DEVICE BASED ON LAYOUT INFORMATION

FIELD OF THE DISCLOSURE

The invention relates to the field of determining a position estimate of a position of a mobile device at least partially based on layout information.

BACKGROUND

Satellite signal based positioning technologies, which are mainly used outdoors, are usually not suited to deliver a satisfactory performance when used for indoor positioning, since satellite radio signals of global navigation satellite systems (GNSS), like the global positioning system (GPS) or the Galileo system, do not penetrate through walls and roofs strongly enough for an adequate signal reception indoors. Thus, these positioning technologies are not able to deliver a performance indoors that would enable seamless, equal and accurate navigation experience outdoors and indoors.

SUMMARY OF SOME EMBODIMENTS OF THE INVENTION

According to an exemplary aspect of the invention, a method performed by a mobile device is disclosed, wherein the method comprises:
  receiving at least one radio signal when scanning for observable radio signals at an observation position of the mobile device;
  determining or causing determining a venue associated with an identifier contained in or represented by the at least one radio signal at least partially based on a plurality of venue information items;
  determining or causing determining a position estimate of the observation position at least partially based on layout information representing a layout of the venue associated with the identifier.

The disclosed method may serve for determining a position estimate of a position (e.g. the position estimate of the observation position) of the mobile device at least partially based on layout information.

The mobile device may be an Internet-of-Thing (IoT) device, a smart home device, a mobile phone like a smart phone, a tablet computer, a notebook computer, a smart watch, and a smart band.

The mobile device may automatically and/or repeatedly scan for observable radio signals. For example, the at least one radio signal may be received by the mobile device when performing such an automatic and/or repeated scan for observable radio signals.

The at least one radio signal may be a terrestrial radio signal. Examples of such a terrestrial radio signal are a Bluetooth radio signal (e.g. a Bluetooth Low Energy (BLE) radio signal), a cellular network radio signal, a low-power wide-area network (LPWAN) radio signal or a wireless local area network (WLAN) radio signal. The Bluetooth standards are specified by the Bluetooth Special Interest Group and are presently available under https://www.bluetooth.com/. A cellular network may for example be a mobile phone network like a 2G/3G/4G/5G cellular communication network. The 2G/3G/4G/5G cellular radio communication standards are developed by the 3GPP and presently available under http://www.3gpp.org/. Examples of LPWAN specifications are the LoRaWAN specification developed by the LoRa Alliance and presently available under https://lora-alliance-.org/ as well as the Narrowband IoT (NB-IoT) specification developed by 3GPP and presently available under http://www.3gpp.org/. WLAN is for example specified by the standards of the IEEE 802.11 family (http://www.ieee.org/).

A radio signal may be understood to be observable at a certain position if the radio signal is receivable by the mobile device with a minimum quality (e.g. a minimum signal-to-noise ratio and/or a minimum signal power, e.g. at least −90 dbm or −95 dbm) at this position. Accordingly, the at least one radio signal may be receivable by the mobile device with such a minimum quality at the observation position such that it is received by the mobile device when scanning for observable radio signals at the observation position of the mobile device.

Moreover, if in addition to the at least one radio signal one or more further radio signals are receivable by the mobile device with such a minimum quality at the observation position, the one or more further radio signals may be received by the mobile device in addition to the at least one radio signal when scanning for observable radio signals at the observation position. It is thus to be understood that more than the at least one radio signal may be received by the mobile device when scanning for observable radio signals at the observation position of the mobile device. If more than the at least one radio signal are received by the mobile device when scanning for observable radio signals at the observation position of the mobile device, one or more radio signals (e.g. the at least one radio signal) of the received radio signals may be selected from the received radio signals for further processing (e.g. such that the further steps of the method are only performed for the selected radio signals), or each of the received radio signals may be further processed (e.g. such that the further steps of the method may be performed for each of the received radio signals). For example, for each of the further processed radio signals (i.e. the selected one or more radio signals or each of the received radio signals) a respective venue associated with the respective identifier contained in or represented by the respective radio signal is determined and, subsequently, a respective position estimate of the observation position is determined at least partially based on layout information representing the layout of the respective venue associated with the respective identifier. Accordingly, the disclosure regarding the further processing of the at least one radio signal (e.g. regarding determining the venue associated with the identifier contained in or represented by the at least one radio signal and determining the position estimate of the observation position at least partially based on layout information representing the layout of the venue associated with the identifier) is to be understood as disclosure for further processing of each of the further processed radio signals. If more than one position estimate of the observation position is determined, only one of the position estimates may be further processed and the other position estimates may be discarded, for example only the position estimate of the position estimates which is closest to the last or current known position (e.g. the last or current known GNSS or cellular or WLAN position) of the mobile device may be further processed.

The observation position may be understood to be the geographic position of the mobile device when scanning for observable radio signals.

A venue may be understood to be or to relate to a certain point of interest (POI). Examples of such a POI are a restaurant, a coffee shop, a hotel, a museum, a school, a university, a shop, a shopping mall, etc.

That the venue is associated with the identifier contained in or represented by the at least one radio signal is determined at least partially based on a plurality of venue information items may be understood to mean that the plurality of venue information items are considered when determining the venue associated with the identifier contained in or represented by the at least one radio signal.

An identifier contained in or represented by a certain radio signal (e.g. the identifier contained in or represented by the at least one radio signal) may be understood to be an identifier of a radio device transmitting the certain radio signal. The identifier may be contained in or represented by the radio signal in form of modulated and/or encoded identifier information representing the identifier. Non limiting examples of such an identifier are a name, an address (e.g. a MAC address or an IP address), a universally unique identifier (UUID), a service set identifier (SSID), a basic service set identifier (BSSID) or a cell identifier (cell ID).

For example, a venue may be understood to be associated with an identifier contained in or represented by the at least one radio signal if the at least one radio signal is transmitted by a radio device installed in or provided by the venue. To this end, it may be assumed that the identifier contained in or represented by the at least one radio signal contains or represents at least a portion of the name of a certain venue if the at least one radio signal is transmitted by a radio device installed in or provided by this certain venue. For example, a radio signal transmitted by a radio device installed in or provided by a venue having the name "Joe's Coffee Shop" may contain or represent "Joe's Coffee—WiFi" as identifier.

Moreover, each of the plurality of venue information items may be associated with a respective venue and may represent a name of the respective venue which is associated with the respective venue information item.

Determining the venue associated with the identifier contained in or represented by the at least one radio signal may thus be understood to mean (1) that a match is determined between the identifier contained in or represented by the at least one radio signal and a respective name represented by a respective venue information item of the plurality of venue information items and (2) that the venue which is associated with the respective venue information item of the plurality of venue information items representing the matching name is determined to be associated with the identifier contained in or represented by the at least one radio signal.

For example, the match between the identifier contained in or represented by the at least one radio signal and a respective name represented by a respective venue information item of the plurality of venue information items may be determined based on predetermined rules like a predetermined matching algorithm, for example a string searching algorithm or an approximate string matching algorithm.

According to a simple matching algorithm, a match may for example be determined by, firstly, determining, for each name represented by the plurality of venue information items, the respective length of the longest substring contained in the respective name and the respective identifier and by, secondly determining the respective name of the respective venue information item of the plurality of venue information items containing the substring having the longest length (i.e. no other substring has a longer length) to match the identifier. Considering the above example where a radio signal transmitted by a radio device installed in or provided by a venue contains or represents "Joe's Coffee—WiFi" as identifier, the name "Joe's Coffee shop" shares "Joe's Coffee" as longest substring with this identifier, whereas the name "Joey's Coffee shop" only shares "'s Coffee" as longest substring with this identifier. According to this example, the name "Joe's Coffee shop" which contains the substring having the longer length may thus be determined to match the identifier "Joe's Coffee—WiFi" based on the above disclosed simple matching algorithm. It is however to be understood that the present invention is not limited to this simple matching algorithm.

Causing determining the venue associated with the identifier contained in or represented by the at least one radio signal may be understood to mean that the mobile device causes another device (e.g. a server) to perform the determining, for example by transmitting control information to the other device configured to cause the other device to perform the determining.

Accordingly, the plurality of venue information items may be hold available by (e.g. stored in a memory of) the device performing the determining (e.g. the mobile device or the other device caused by the mobile device to perform the determining). Alternatively or additionally, the plurality of venue information items may be accessible by (e.g. accessible via a network connection by) the device performing the determining (e.g. the mobile device or the other device caused by the mobile device to perform the determining). For example, the plurality of venue information items may be part of a database that is hold available or accessible by this device.

Determining a position estimate of the observation position at least partially based on layout information representing a layout of the venue associated with the identifier may be understood to mean that the layout represented by the layout information is considered when determining the position estimate of the observation position. It is to be understood that the observation position may deviate from the position estimate obtained as a result of the determining.

A position estimate of the observation position obtained as a result of the determining may be understood to represent one of (1) a position (e.g. a geographic position) that is estimated to correspond to the observation position or (2) a position of an area (e.g. a geographic area) that is estimated to cover the observation position. A position may be represented in form of position coordinates (e.g. geographic position coordinates like longitude and latitude) representing the position; and a position of an area may be represented in form of position coordinates (e.g. geographic position coordinates like longitude and latitude) representing at least one of (1) one or more boundary points of the area or (2) a center of the area. In a simple example, a circular area and a rectangular area may be represented by position coordinates representing the position of the center of the circular area and the rectangular area, respectively. According to this simple example, if the circular area or the rectangular area is estimated to cover the observation position, the position estimate of the observation position obtained as a result of the determining may simply represent the center of the circular area or the rectangular area. In a more complex example, the circular may be represented by position coordinates representing the position of the center of the circular area and a radius value defining the boundary points of the circular area; and the rectangular area may be represented by position coordinates (e.g. geographic position coordinates) representing the position of the corners (i.e. boundary points) of the rectangular area. According to this more complex example, if the circular area or the rectangular area is estimated to cover the observation position, the position estimate of the observation position obtained as a result of the determining may represent the position of the center of the circular area and the radius value or the position of the corners of the rectangular area.

The layout of the venue may be understood to be representative of a position (e.g. a geographic position) of at least one of a certain area (e.g. an entrance or exit area or a common area like a seating area, a waiting area, a walking area or a service or sales area) or a certain feature (e.g. outer boundaries or walls, an entrance or an exit) of the venue. An example of a layout of the venue may be a floor map of the venue. Accordingly, a position of at least one of a certain area or a certain feature represented by the layout of the venue may be determined as position estimate of the observation position. To this end, it may be determined based on predetermined rules in which area or close to which feature of the venue the observation position of the mobile device is located. For example the predetermined rules may specify that, if the mobile device automatically and/or repeatedly scans for observable radio signals and receives the at least one radio signal at the observation position for the first time, the position estimate of the observation position may be determined to be a position of one of (1) an area or position outside outer boundaries or walls of the venue, (2) an entrance or exit area of the venue or (3) an entrance or exit of the venue; and, if the mobile device automatically and/or repeatedly scans for observable radio signals and has received the at least one radio signal more than a predetermined threshold number before, the position estimate of the observation position may be determined to be a position of one of (1) an area or position inside outer boundaries or walls of the venue or (2) a common area of the venue (e.g. a seating area, a waiting area, a walking area or a service or sales area of the venue). It is to be understood that the present invention is not limited to this example and that the determining may be performed based on additional or other information (e.g. motion of the mobile device or received signal strength of the at least one radio signal as disclosed below in more detail).

The layout information representing the layout of the venue may be part of the venue information item associated with the venue (i.e. the venue that is determined to be associated with the identifier contained in or represented by the at least one radio signal).

Causing determining a position estimate of the observation position at least partially based on layout information representing a layout of the venue associated with the identifier may be understood to mean that the mobile device causes another device (e.g. a server) to perform the determining, for example by transmitting control information to the other device configured to cause the other device to perform the determining.

Accordingly, the layout information may be hold available by (e.g. stored in a memory of) the device performing the determining (e.g. the mobile device or the other device caused by the mobile device to perform the determining). Alternatively or additionally, the layout information may be accessible by (e.g. accessible via a network connection by) the device performing the determining (e.g. the mobile device or the other device caused by the mobile device to perform the determining).

The disclosed method thus enables to consider a layout of the venue when determining a position estimate of the observation position and to take even further information into consideration when determining the position estimate. This has for example the effect that the expected accuracy of the position estimate is increased, for example in comparison to solutions which only consider a single geographic position of the venue when determining such a position estimate.

According to a further exemplary aspect of the invention, an apparatus is disclosed, wherein the apparatus comprises means for performing the steps of any one embodiment of the disclosed method or a part thereof (e.g. at least some steps of any one embodiment of the disclosed method).

The means of the disclosed apparatus can be implemented in hardware and/or software. They may comprise for instance a processor for executing computer program code for realizing the required functions, a memory storing the program code, or both. Alternatively, they could comprise for instance circuitry that is designed to realize the required functions, for instance implemented in a chipset or a chip, like an integrated circuit. The disclosed apparatus may comprise a single means for all functions, a common plurality of means for all functions, or a plurality of different means for different functions.

According to a further exemplary aspect of the invention, an apparatus is disclosed, wherein the apparatus comprises at least one processor and at least one memory containing computer program code, the at least one memory and the computer program code with the at least one processor configured to cause the apparatus at least to perform any one embodiment of the disclosed method (e.g. the steps of any one embodiment of the disclosed method) or a part thereof (e.g. at least some steps of any one embodiment of the disclosed method).

For example, the disclosed apparatus(es) may be (a) module(s) (e.g. (a) component(s)) for (a) mobile device(s), for example (a) chip(s) or chipset(s). Alternatively, the disclosed apparatus(es) may be (a) mobile device(s). As disclosed above, the mobile device may be an Internet-of-Thing (IoT) device, a smart home device, a mobile phone like a smart phone, a tablet computer, a notebook computer, a smart watch, and a smart band.

It is to be understood that the disclosed apparatus(es) may comprise only the disclosed components (e.g. means) or may further comprise one or more additional components (e.g. means). Examples of such additional components are a radio interface (e.g. a receiver, a transmitter and/or a transceiver), a data interface, a user interface (e.g. a touch-sensitive display, a keyboard, a touchpad, a display, etc.), a sensor, etc.

According to a further exemplary aspect of the invention, a system is disclosed which comprises a mobile device (e.g. an apparatus as disclosed above in form of a mobile device) and at least one of (1) a server and (2) a radio device (e.g. a radio device installed in or provided by a venue, the radio device transmitting the at least one radio signal as disclosed above).

According to a further exemplary aspect of the invention, a non-transitory computer readable storage medium is disclosed, in which computer program code is stored. The computer program code causes an apparatus to perform any one embodiment of the disclosed method (e.g. the steps of any one embodiment of the disclosed method) when executed by a processor or by a plurality of processors. The computer program code could be stored in the computer readable storage medium in the form of instructions encoding the computer-readable storage medium. The computer readable storage medium may be intended for taking part in the operation of a device, like an internal or external hard disk of a computer, or be intended for distribution of the program code, like an optical disc.

According to a further exemplary aspect of the invention, a computer program code is disclosed, the computer program code when executed by a processor (or by a plurality of processors) causing an apparatus to perform any one embodiment of the disclosed method (e.g. the steps of any one embodiment of the disclosed method).

The disclosed method, apparatus(es), system, non-transitory computer readable storage medium and computer program code may serve for determining a position estimate of a position of a/the mobile device at least partially based on layout information.

In the following, further features and embodiments of these exemplary aspects of the invention will be described.

According to an exemplary embodiment of the invention, the method further comprises:
   extracting the identifier from the at least one radio signal.

As disclosed above, the identifier may be contained in or represented by the at least one radio signal in form of modulated and/or encoded identifier information representing the identifier. Accordingly, extracting the identifier from the at least one radio signal may be understood to comprise demodulating and/or decoding the identifier information from the at least one radio signal. As a result of the extracting, the identifier information representing the identifier may be obtained.

According to an exemplary embodiment of the invention, the method further comprises:
   capturing a received signal strength of the at least one radio signal when scanning for observable radio signals at the observation position.

Capturing the received signal strength when scanning for observable radio signals at the observation position may be understood to mean that a received signal strength parameter representing the received signal strength of the at least one radio signal at the observation position is determined (e.g. measured) when the at least one radio signal is received when scanning for observable radio signals at the observation position. An example of such a received signal strength parameter is a received signal strength value in dBm or a received signal strength indicator (RSSI) value. As a result of the capturing, a received signal strength information representing the determined (e.g. measured) received signal strength parameter may be obtained.

It is to be understood that, if more than the at least one radio signal are received when scanning for observable radio signals at the observation position, for each of the received radio signals a respective received signal strength may be captured. Moreover, if more than the at least one radio signal are received when scanning for observable radio signals at the observation position, one or more radio signals (e.g. the at least one radio signal) of the received radio signals may be selected from the received radio signals for further processing based on the received signal strengths. For example, the radio signal of the received radio signals having the strongest received signal strength may be selected for further processing (e.g. such that the further steps of the method are only performed for the selected radio signal). Alternatively, the radio signals of the received radio signals having a respective received signal strength stronger than a predetermined threshold received signal strength may be selected for further processing (e.g. such that the further steps of the method are only performed for the selected radio signals).

Alternatively or additionally, the received signal strength of the at least one radio signal may be considered when determining the position estimate. For example, the position estimate may be determined further based on the received signal strength of the at least one radio signal.

As disclosed above, the layout of the venue may be understood to be representative of a position (e.g. a geographic position) of at least one of a certain area (e.g. an entrance or exit area or a common area like a seating area, a waiting area, a walking area or a service or sales area) or a certain feature (e.g. outer boundaries or walls, an entrance or an exit) of the venue. Accordingly, a position of at least one of a certain area or a certain feature represented by the layout of the venue may be determined as position estimate of the observation position. To this end, it may be determined based on predetermined rules in which area or close to which feature of the venue the observation position of the mobile device is located. For example the predetermined rules may specify that, if the received signal strength of the at least one radio signal is equal to or stronger than a predetermined received signal strength threshold, the position estimate of the observation position may be determined to be a position of one of (1) an area or position inside outer boundaries or walls of the venue or (2) a common area of the venue (e.g. a seating area, a waiting area, a walking area or a service or sales area of the venue); and, if the received signal strength of the at least one radio signal is weaker than the predetermined received signal strength threshold, the position estimate of the observation position may be determined to be a position of at least one of (1) an area or position outside outer boundaries or walls of the venue, (2) an entrance or exit area of the venue or (3) an entrance or exit of the venue. It is to be understood that the present invention is not limited to this example and that the determining may be performed based on additional or other information (e.g. motion of the mobile device as disclosed below in more detail).

Since a strong received signal strength of a radio signal typically indicates that the distance to the radio device transmitting the radio device is short, considering the received signal strength as disclosed above has for example the effect that the expected accuracy of the position estimate is further increased, for example in comparison to solutions not considering the received signal strength.

According to an exemplary embodiment of the invention, the method further comprises:
   capturing a motion of the mobile device (e.g. at the observation position or when scanning for observable radio signals at the observation position).

Capturing the motion of the mobile device may be understood to mean that a motion parameter that is characteristic of the captured motion of the mobile device is determined (e.g. measured). Examples of such a motion parameter are a speed parameter representative of a speed value of the mobile device or of a user of the mobile device, an acceleration parameter representative of an acceleration value of the mobile device or of a user of the mobile device, an activity parameter representative of an activity (e.g. static, sitting, walking, running, cycling, swimming, etc.) of mobile device or of a user of the mobile device, a step parameter representative of a step length or step count of a user of mobile device when capturing the motion of the mobile device. As a result of the capturing, a motion information representing the determined (e.g. measured) motion parameter may be obtained.

For example, the motion of the mobile device (e.g. at the observation position or when scanning for observable radio signals at the observation position) may be considered when determining the position estimate. For example, the position estimate may be determined further based on the motion of the mobile device (e.g. at the observation position or when scanning for observable radio signals at the observation position).

As disclosed above, the layout of the venue may be understood to be representative of a position (e.g. a geographic position) of at least one of a certain area (e.g. an entrance or exit area or a common area like a seating area, a waiting area, a walking area or a service or sales area) or a certain feature (e.g. outer boundaries or walls, an entrance or an exit) of the venue. Accordingly, a position of at least one of a certain area or a certain feature represented by the layout of the venue may be determined as position estimate of the observation position. To this end, it may be determined based on predetermined rules in which area or close to which feature of the venue the observation position of the mobile device is located. For example the predetermined rules may specify that, if the mobile device is/was in motion (e.g. a user carrying the mobile device is/was walking or running) when scanning for observable radio signals at the observation position, the position estimate of the observation position may be determined to be a position of one of a (1) a walking area of the venue, (2) an entrance or exit area of the venue or (3) an entrance or exit of the venue; and, if the mobile device is/was static (e.g. a user carrying the mobile device is/was sitting) when scanning for observable radio signals at the observation position, the position estimate of the observation position may be determined to be a position of at least one of (1) a seating are of the venue or (2) a waiting area of the venue. It is to be understood that the present invention is not limited to this example and that the determining may be performed based on additional or other information (e.g. the received signal strength of the at least one radio signal as disclosed above in more detail).

Considering the motion of the mobile device when determining the position estimate as disclosed above has for example the effect that the expected accuracy of the position estimate is further increased, for example in comparison to solutions not considering the motion.

According to an exemplary embodiment of the invention, the layout of the venue (e.g. the layout of the venue represented by the layout information) is representative of a position of at least one of:
   outer boundaries or outer walls of the venue;
   an entrance or an exit of the venue;
   an entrance or exit area of the venue;
   a seating area of the venue;
   a waiting area of the venue;
   a walking area of the venue;
   a service or sales area of the venue;
   a common or public area of the venue;
   a private area of the venue.

That the layout of the venue (e.g. the layout of the venue represented by the layout information) is representative of a position of such a feature or area of the venue may be understood to mean that the layout is configured to enable determining the position coordinates of the position (e.g. in form of geographic position coordinates like longitude and latitude or in form of GNSS coordinates).

As disclosed above, an example of a layout of the venue may be a floor map of the venue. For example, the layout information may represent such a floor map of the venue. The floor map may represent the position of one or more of certain features of the venue (e.g. outer boundaries or walls, entrance or exit) and certain areas of the venue (e.g. entrance or exit area, seating area, waiting area, walking area, service or sales area, common or public area, private area). For example, the floor map may represent the position(s) of the one or more of the certain features and certain areas of the venue relatively to a predetermined geographic position of the venue (e.g. a predetermined point of interest position of the venue). Alternatively, the floor map may represent the geographic position(s) of the one or more of the certain features and certain areas.

According to an exemplary embodiment of the invention, the method further comprises:
   determining a confidence level associated with the position estimate at least partially based on a venue information item of the plurality of venue information items, wherein the venue information item of the plurality of venue information items is associated with the venue.

A confidence level may be understood to qualitatively or quantitatively represent a probability that the position estimate of the observation position is correct (i.e. the position estimate of the observation position correctly represents the observation position). For example, the higher the confidence level the higher the probability that the position estimate of the observation position is correct.

The determining may be performed according to predetermined rules. As a result of the determining, confidence level information representing the determined confidence level may be obtained.

That the confidence level associated with the position estimate is determined at least partially based on the venue information item of the plurality of venue information items associated with the venue may be understood to mean that this venue information item is considered when the confidence level is determined. For example, the confidence level may be determined at least partially based on at least one of venue type information, opening hours information or visit frequency information represented by the venue information item of the plurality of venue information items.

Venue type information may represent the type of the venue. Examples of such a type of the venue are "restaurant", "coffee shop", "hotel", "museum", "school", "university", "shop", "shopping mall", etc. Opening hours information may represent the opening hours of the venue. Visit frequency information may represent a visit frequency profile of the venue over a day. Since it is rather unlikely that the observation position is/was inside the venue when the venue is closed or the visit frequency of the venue is low, the venue type information, the opening hours information and the visit frequency information may be helpful in determining the confidence level. For example, the predetermined rules may specify that, if venues of the same venue type as represented by the venue type information are typically closed at the time the at least one radio signal is/was received, the confidence level associated with the position estimate is determined to be low and, otherwise, the confidence level associated with the position estimate is determined to be high. Alternatively or additionally, the predetermined rules may specify that, if the venue is/was closed according to the opening hours as represented by the opening hours information at the time the at least one radio signal is/was received, the confidence level associated with the position estimate is determined to be low and, otherwise, the confidence level associated with the position estimate is determined to be high. Alternatively or additionally, the predetermined rules may specify that, if the visit frequency of the venue is low as represented by the visit frequency information at the time the at least one radio signal is/was received, the confidence level associated with the position estimate is determined to be low and, otherwise, the confidence level associated with the position estimate is determined to be high. It is to be understood that the present invention is not limited to these exemplary predetermined rules.

As disclosed above, if more than the at least one radio signal is received when scanning for observable radio signals at the observation position, each of the received radio signals or one or more selected radio signals may be further processed such that, for each of the further processed radio signals, a respective venue associated with the respective identifier contained in or represented by the respective radio signal is determined and, subsequently, a respective position estimate of the observation position is determined at least partially based on layout information representing the layout of the respective venue associated with the respective identifier such that more than one position estimate is obtained. Moreover, for each of the position estimates, a respective confidence level associated with the respective position estimate may be determined as disclosed above. This may for example be advantageous when the position estimates are further processed (e.g. displayed to a user). For example, only the position estimate associated with the highest confidence level may be further processed; the other position estimates may be discarded. Alternatively or additionally, the confidence levels associated with the position estimates may be considered when further processing the position estimates.

According to an exemplary embodiment of the invention, the method further comprises:

presenting the position estimate of the observation (e.g. to a user).

For example, the position estimate of the observation position is presented by a user interface, for example by displaying the position estimate. In particular, the position estimate may be presented as position point in a map view displayed on a display of the mobile device. As disclosed above, if more than one position estimate is obtained, only the position estimate associated with highest confidence level may be displayed; alternatively or additionally, the position estimate(s) may be displayed together with an indication of the confidence level associated with the (respective) position estimate (e.g. by use of different colors, shadings or icons).

According to an exemplary embodiment of the invention, the at least one radio signal is one of:
a Bluetooth radio signal (e.g. a Bluetooth Low Energy (BLE) radio signal);
a wireless local area network (WLAN) radio signal;
a low-power wide-area network (LPWAN) radio signal;
a cellular network radio signal.

Accordingly, the at least one radio signal may be transmitted by one of the following radio devices:
a Bluetooth beacon (e.g. a Bluetooth beacon enabling Bluetooth low energy mode or a Bluetooth low energy beacon);
an access point of a wireless local area network (WLAN);
an access point of a low-power wide area network (LPWAN); and
a cellular network node.

The Bluetooth beacons may comprise a Bluetooth and/or BLE radio interface, which includes at least a Bluetooth and/or BLE transmitter. The Bluetooth and/or BLE transmitter may also be a part of a Bluetooth and/or BLE transceiver. The Bluetooth and/or BLE radio interface may be configured to transmit Bluetooth and or BLE radio signals. Bluetooth technologies are supported by many mobile devices by default such as most smartphones, most tablet computers, most notebook computers, most smart watches and most smart bands, etc. Using Bluetooth radio signals may thus have the effect that many mobile devices may be able to receive the at least one radio signal.

A WLAN access point may comprise a WLAN radio interface, which for example includes a WLAN transceiver. The WLAN radio interface may be configured to transmit and/or receive WLAN radio signals. Accordingly, the radio signal transmitted by such an access point may be a WLAN radio signal. Since venues often provide a public WLAN access point and most mobile devices support WLAN, using WLAN radio signals may thus allow to make use of the existing WLAN access point infrastructure and to enable most mobile devices to be able to receive the at least one radio signal.

An LPWAN access point may comprise an LPWAN radio interface, which for example includes an LPWAN transceiver. The LPWAN radio interface may be configured to transmit and/or receive LPWAN radio signals. Accordingly, the radio signal transmitted by such an access point of an LPWAN may be an LPWAN radio signal.

A cellular network node may be a base transceiver station (BTS) or a node-B of a cellular network like a 2G/3G/4G/5G cellular communication network. A cellular network node may comprise a cellular radio interface, which for example includes a 2G/3G/4G/5G transceiver. Accordingly, the radio signal transmitted by such cellular network node may be a 2G/3G/4G/5G cellular radio signal.

According to an exemplary embodiment of the invention, the identifier of the at least one radio signal is one of:
a protocol data unit (PDU);
a universally unique identifier (UUID);
a service set identifier (SSID);
a basic service set identifier (BSSID);
a cell identifier (cell ID).

A protocol data unit (PDU) may for example be understood to be a PDU according to according to a Bluetooth specification (e.g. a BLE specification).

A universally unique identifier (UUID) may for example be contained in or represented by a Bluetooth radio signal.

An SSID or BSSID may for example be contained in or represented by a WLAN radio signal.

A cell identifier may be understood to be a cell ID (CID) or UTRAN cell ID (LCID) which is contained in or represented by a cellular radio signal like a 2G/3G/4G/5G cellular radio signal.

According to an exemplary embodiment of the invention, the venue is a point of interest (POI). As disclosed above, examples of such a POI are a restaurant, a coffee shop, a hotel, a museum, a school, a university, a shop, a shopping mall, etc.

According to an exemplary embodiment of the invention, the plurality of venue information items is part of a point of interest (POI) database. Such a POI database may for example comprise a plurality of POI data items (e.g. corresponding to the plurality of venue information items), wherein each POI data item of the plurality of POI data items may be associated with a respective POI and represent information about the respective POI. For example the information about the POI may represent one or more of a name, a geographic position, a type, opening hours, a visit frequency, contact details (e.g. address, phone number, website address, email address, etc.), a layout of the POI. An example data format for such a POI data item is the JavaScript Object Notation (JSON) data format or the Extensible Markup Language (XML) data format.

It is to be understood that the POI database may be hold available by a server and may be accessed by a device like the mobile device via a network connection. Alternatively, the POI database may for example be hold available locally by a device like the mobile device.

It is to be understood that the presentation of the invention in this section is merely by way of examples and non-limiting.

Other features of the invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE FIGURES

The following description serves to deepen the understanding of the present invention and shall be understood to complement and be read together with the description of example embodiments of the invention as provided in the above SUMMARY section of this specification.

Figure 1:
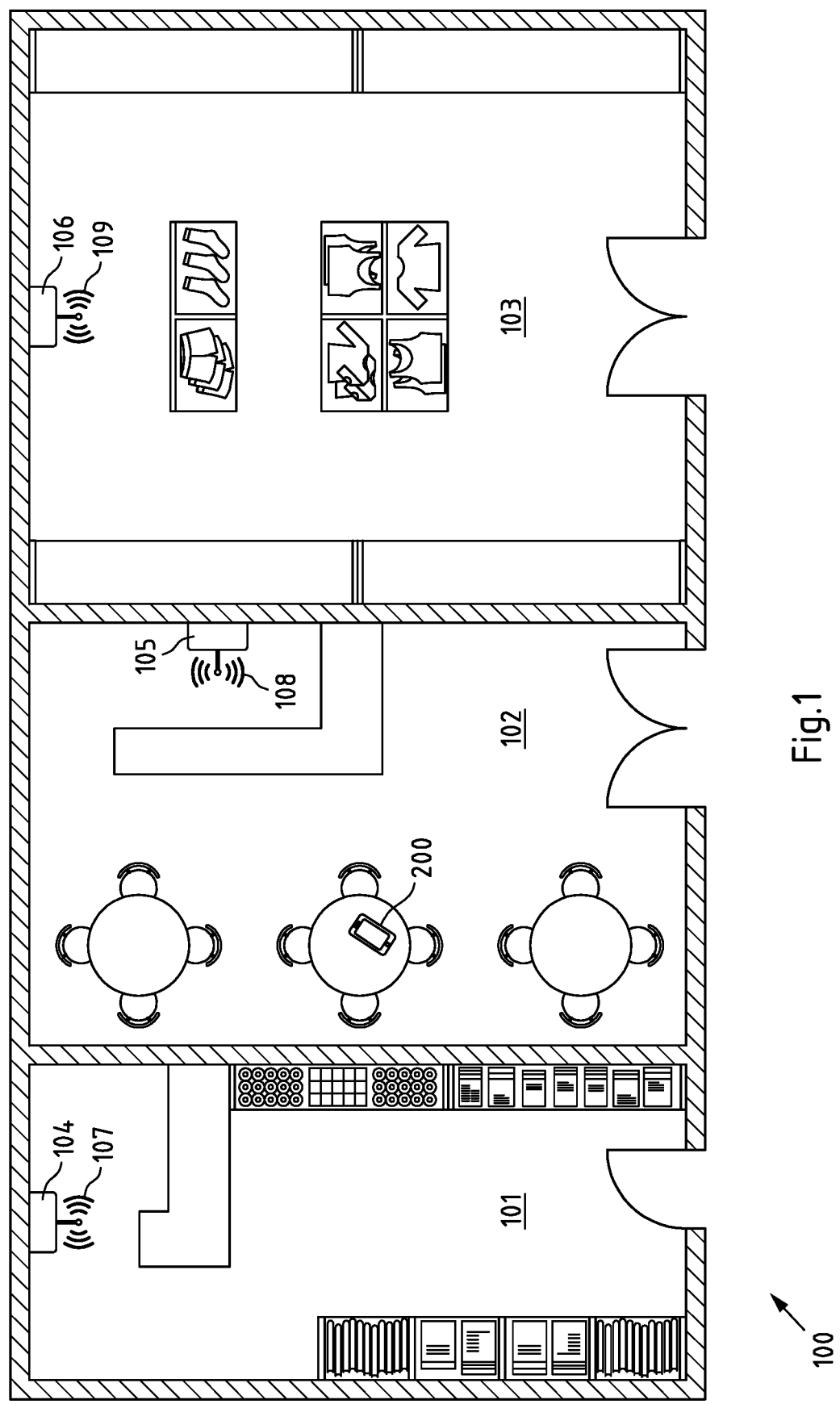
FIG. 1 is a block diagram of an exemplary embodiment of a system according to the invention.

FIG. 1 is a schematic high-level block diagram of a system 100 according to an exemplary embodiment of the invention. System 100 is part of an indoor environment with different venues or POIs like a newspaper kiosk 101, a coffee shop 102 and a clothes shop 103.

System 100 comprises a mobile device 200 and radio devices 104 to 106. It is to be understood that system 100 may comprise further radio devices and/or mobile devices. In the following, it is thus referred to mobile device 200 and radio devices 104 to 106 without limiting the scope of the invention.

For example, mobile device 200 may be a mobile device of a guest of coffee shop 102 and, thus, it is positioned in coffee shop 105 as shown in FIG. 1. Examples of mobile device 200 are a smartphone, a tablet computer, a notebook computer, a smart watch and a smart band.

Radio devices 104 to 106 may be WLAN access points. It is to be understood that system 100 is not limited to WLAN access points as radio devices 104 to 106. In the following, it is thus referred to radio devices 104 to 106 as WLAN access points 104 to 106 for exemplary purposes only without limiting the scope of the invention.

As shown in FIG. 1, WLAN access point 104 is installed in newspaper kiosk 104, WLAN access point 105 is installed in coffee shop 102 and WLAN access point 106 is installed in clothes shop 103. In particular, WLAN access points 104 to 106 may be installed in and provided by the respective one of newspaper kiosk 101, coffee shop 102 and clothes shop 103 in order to provide WLAN access to guests of the respective venue or POI. To this end, each of WLAN access points 104 to 106 may be configured for automatically and repeatedly transmitting a respective WLAN radio signal containing or representing a respective basic service set identifier (BSSID) identifying the respective one of newspaper kiosk 101, coffee shop 102 and clothes shop 103 that provides the respective WLAN access point that has transmitted the respective WLAN radio signal, for example the respective BSSID may contain or represent at least a portion of the name of the respective one of newspaper kiosk 101, coffee shop 102 and clothes shop 103. In the following, it is assumed that newspaper kiosk 101 has the name "Jim's News" and that WLAN radio signal 107 transmitted by WLAN access point 104 contain or represent "Jim's News—free WiFi" as BSSID, that coffee shop 102 has the name "Joe's Coffee Shop" and that WLAN radio signal 108 transmitted by WLAN access point 105 contains or represents "Joe's Coffee Shop—WiFi" as BSSID and that clothes shop 103 has the name "Clothes & More" and that WLAN radio signal 108 transmitted by WLAN access point 105 contains or represents "clothes and more—guest wlan" as BSSID. As disclosed above, WLAN is specified by the standards of the IEEE 802.11 family (http://www.ieee.org/).

Figure 2:
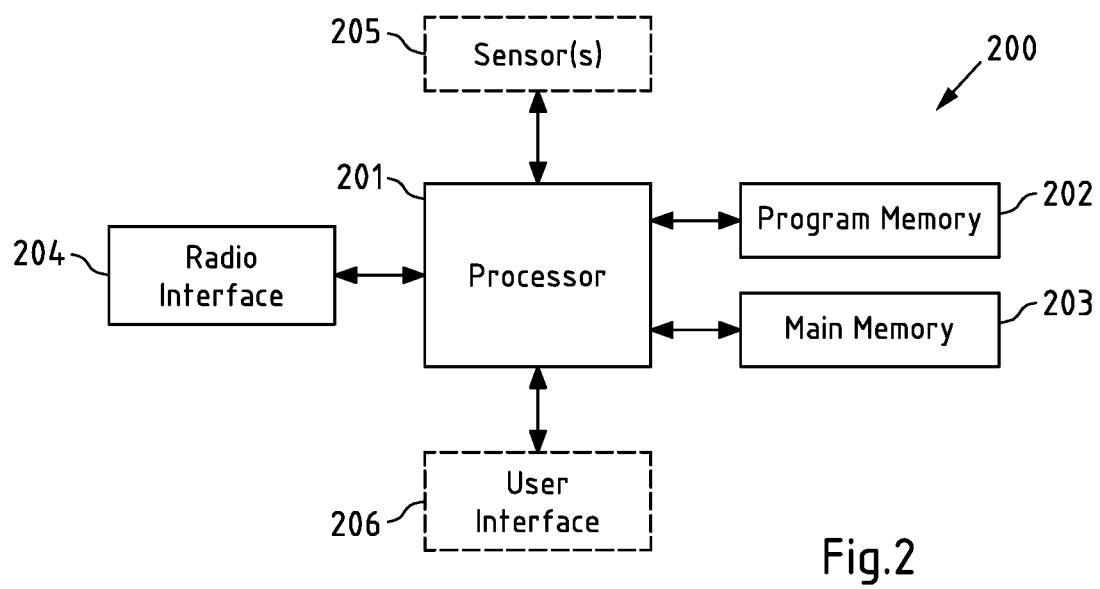
FIG. 2 is a block diagram of an exemplary embodiment of an apparatus according to the invention.

FIG. 2 is a block diagram of an exemplary embodiment of a mobile device according to the invention. In the following, it is assumed that this mobile device corresponds to mobile device 200 of system 100 of FIG. 1.

Mobile device 200 comprises a processor 201. Processor 201 may represent a single processor or two or more processors, which are for instance at least partially coupled, for instance via a bus. Processor 201 executes a program code stored in program memory 202 (for instance program code causing mobile device 200 to perform one or more of the embodiments of a method according to the invention or parts thereof (e.g. the method or parts of the method disclosed below with reference to flowchart 300 of FIG. 3), when executed on processor 201) and interfaces with a main memory 203. Program memory 202 may also comprise an operating system for processor 201. Some or all of memories 202 and 203 may also be included into processor 201.

A program memory (e.g. program memory 202) may for example be a non-volatile memory. It may for instance be a FLASH memory (or a part thereof), any of a ROM, PROM, EPROM, MRAM or a FeRAM (or a part thereof) or a hard disc (or a part thereof), to name but a few examples. For example, a program memory may for instance comprise a first memory section that is fixedly installed, and a second memory section that is removable, for instance in the form of a removable SD memory card.

A main memory (e.g. main memory 203) may for example be a volatile memory. It may for example be a DRAM memory, to give non-limiting example. It may for instance be used as a working memory for a processor (e.g. processor 201) when executing an operating system and/or programs.

Processor 201 controls radio interface 204 configured to receive and/or transmit WLAN radio signals. For instance, radio interface 204 may at least comprise a WLAN component including a WLAN transmitter (TX) and a WLAN receiver (RX). The transmitter and receiver may also be part of a WLAN transceiver (TRX). The WLAN transmitter enables mobile device 200 to transmit WLAN radio signals. Likewise, the WLAN receiver enables mobile device 200 to receive WLAN radio signals. For example, the radio interface 204 may be configured to repeatedly scan for observable radio signals.

Moreover, radio interface 204 may be configured to extract a respective BSSID from each WLAN radio signal received when scanning for observable radio signals and to capture, for each WLAN radio signal received when scanning for observable radio signals, a respective received signal strength of the respective WLAN radio signal. As a result of the extracting, identifier information representing the BSSID may be obtained. As disclosed above, capturing a received signal strength may be understood to mean that a received signal strength parameter representing the received signal strength is determined (e.g. measured). An example of such a received signal strength parameter is a received signal strength value in dBm or a received signal strength indicator (RSSI) value. As a result of the capturing, a received signal strength information representing the determined (e.g. measured) received signal strength parameter may be obtained.

The extracted BSSID (e.g. in form of the identifier information) and the captured received signal strength (e.g. in form of the received signal strength information) may then for example be provided to processor 200. It is to be understood that any computer program code based processing required for receiving and processing received WLAN radio signals may be stored in an own memory of the radio interface 204 and executed by an own processor of the radio interface 204 or it may be stored for example in memory 202 and executed for example by processor 201.

Moreover, processor 201 controls optional motion sensor 205 configured capturing a motion of mobile device 200. As disclosed above, capturing the motion of mobile device 200 may be understood to mean that a motion parameter that is characteristic of the captured motion of the mobile device is determined (e.g. measured). Examples of such a motion parameter are a speed parameter representative of a speed value of mobile device 200 or of a user of mobile device 200, an acceleration parameter representative of an acceleration value of mobile device 200 or of a user of mobile device 200, an activity parameter representative of an activity (e.g. sitting, walking, running, cycling, swimming, etc.) of mobile device 200 or of a user of mobile device 200 or a step parameter representative of a step length or step count of a user of mobile device 200. Accordingly the motion sensor 205 may be at least one of a speed sensor, an acceleration sensor, an activity sensor or a step sensor. As a result of the capturing, a motion information representing the determined (e.g. measured) motion parameter may be obtained. The captured motion (e.g. in form of the motion information) may then for example be provided to processor 200. It is to be understood that any computer program code required for capturing motion parameters may be stored in an own memory of motion sensor 205 and executed by an own processor of the motion sensor 205 or it may be stored for example in memory 202 and executed for example by processor 201.

Moreover, processor 201 controls optional user interface 206 configured to present information to a user of mobile device 200 and/or to receive information from such a user. User interface 206 may for instance be the standard user interface via which a user of mobile device 200 controls other functionality thereof. Examples of such a user interface are a touch-sensitive display, a keyboard, a touchpad, a display, etc.

The components 202 to 206 of mobile device 400 may for instance be connected with processor 201 by means of one or more serial and/or parallel busses.

It is to be understood that mobile device 200 may comprise various other components. For example, mobile device 200 may optionally comprise a further radio interface configured to receive and/or transmit cellular radio signals like 2G/3G/4G/5G cellular radio signals. As disclosed above, the 2G/3G/4G/5G cellular radio communication standards are developed by the 3GPP and presently available under http://www.3gpp.org/.

Figure 3:
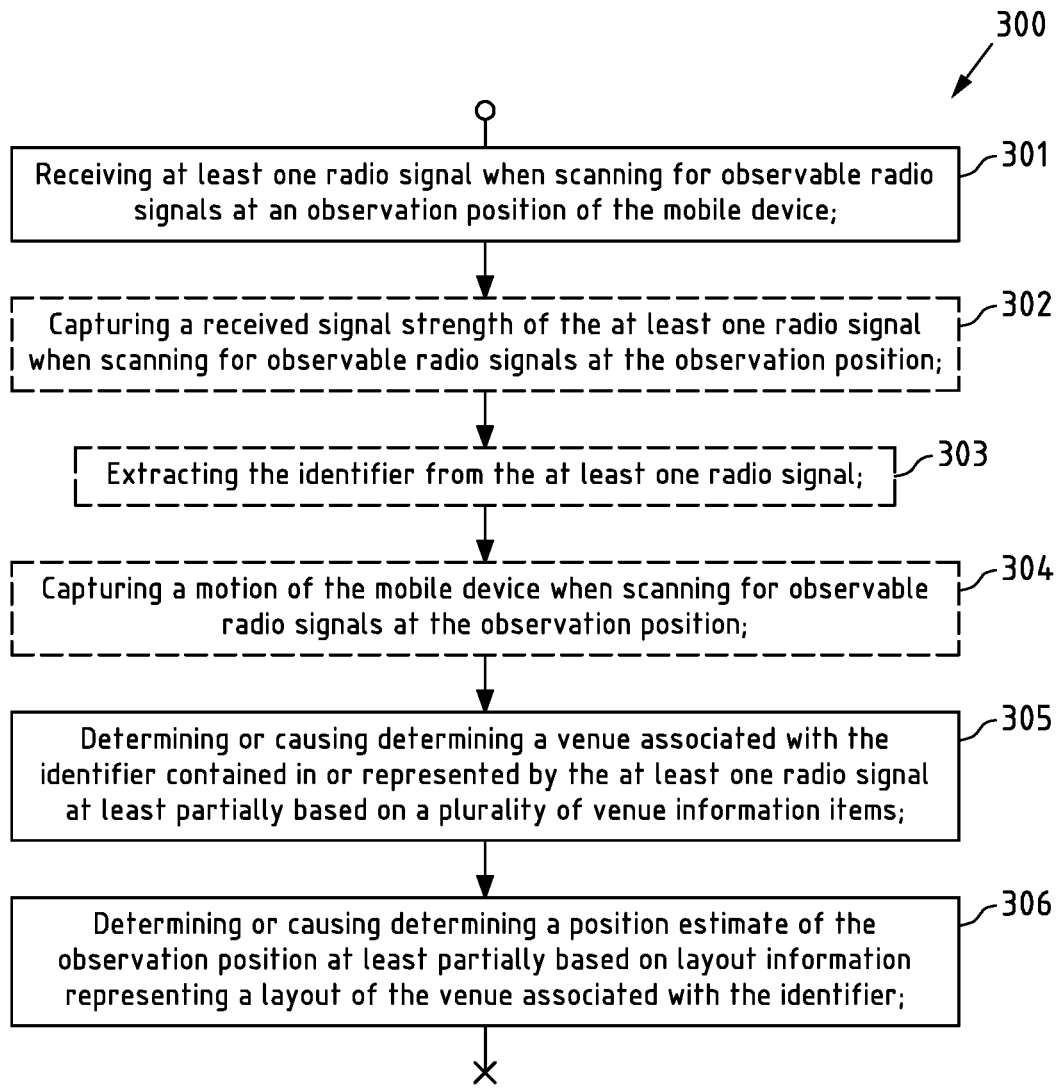
FIG. 3 is a flow chart illustrating an exemplary embodiment of a method according to the invention.

FIG. 3 is a flow chart 300 illustrating an exemplary embodiment of a method according to the invention. Without limiting the scope of the invention, it is assumed in the following that mobile device 200 of system 100 as described above with respect to FIG. 1 performs the steps of flow chart 300.

In a step 301, at least one radio signal is received by mobile device 200 when scanning for observable radio signals at an observation position of mobile device 200.

As disclosed above, radio interface 204 of mobile device 200 may be configured to repeatedly scan for observable radio signals. The scanning in step 301 may be understood to be one of such repeated scans for observable radio signals. Therein, the position where the scanning in step 301 is performed is referred to as observation position of mobile device 200. In the following, it is assumed for exemplary purposes that this observation position corresponds to the position of mobile device 200 as shown in FIG. 1.

A radio signal may be understood to be observable at the observation position if the radio signal is receivable by mobile device 200 with a minimum quality (e.g. a minimum signal-to-noise ratio and/or a minimum signal power, e.g. at least −90 dbm or −95 dbm) at the observation position. In the following, it is further assumed for exemplary purposes that WLAN radio signals 107 to 109 are receivable by mobile device 200 with such a minimum quality at the observation position.

Accordingly, mobile device 200 receives WLAN radio signals 107 to 109 when scanning for observable radio signals in step 301.

In an optional step 302, a received signal strength of the at least one radio signal is captured by mobile device 200 when scanning for observable radio signals at the observation position, and, in an optional step 303, an identifier is extracted from the at least one radio signal by mobile device 200. It is to be understood that optional step 302, optional step 303 or both may be part of step 301.

As disclosed above, radio interface 204 may be configured to capture, for each WLAN radio signal received when scanning for observable radio signals, a respective received signal strength of the respective WLAN radio signal and to extract a respective BSSID from each WLAN radio signal received when scanning for observable radio signals. Accordingly, the received signal strengths of WLAN radio signals 107 to 109 at the observation position may be captured in step 302; and the BSSIDs contained in or represented by WLAN radio signals 107 to 109 are extracted in step 303.

As a result of the capturing in step 302, received signal strength information representing, for each of WLAN radio signals 107 to 109, a respective received signal strength parameter (e.g. a received signal strength value in dBm or a received signal strength indicator (RSSI) value) may be obtained; and, as a result of the extracting in step 303, identifier information representing, for each WLAN radio signal, the respective BSSID may be obtained.

As disclosed above, received signal strengths of WLAN radio signals 107 to 109 may be used for selecting one or more of WLAN radio signals 107 to 109 for further processing. In the following, it is assumed for exemplary purposes, that the WLAN radio signal of WLAN radio signals 107 to 109 having the strongest received signal strength (e.g. as represented by the received signal strength parameters represented by the received signal strength information obtained for WLAN radio signals 107 to 109 as result of the capturing in step 302) is selected for further processing. It is however to be understood that the invention is not limited to this.

In the exemplary scenario of FIG. 1, WLAN radio signal 108 has the strongest received signal strength at the observation position of mobile device 200 which is positioned in coffee shop 102, because WLAN radio signals 107 and 109 are for example attenuated when penetrating the walls between venues or POIs 101 and 103, respectively, and coffee shop 102. Therefore, WLAN radio signal 108 is selected for further processing which means that further steps 304 to 306 are only performed for WLAN radio signal 108.

In an optional step 304, a motion of mobile device 200 is captured by mobile device 200 when scanning for observable radio signals at the observation position. It is to be understood that optional step 304 like optional steps 302 and 303 may be part of step 301.

As disclosed above, motion sensor 205 is configured for capturing a motion of mobile device 200. As a result of the capturing in step 304, a motion information representing a motion parameter that is characteristic of the captured motion of the mobile device may be obtained. Examples of such a motion parameter are a speed parameter representative of a speed value of mobile device 200 or of a user of mobile device 200, an acceleration parameter representative of an acceleration value of mobile device 200 or of a user of mobile device 200, an activity parameter representative of an activity (e.g. sitting, walking, running, cycling, swimming, etc.) of mobile device 200 or of a user of mobile device 200 or a step parameter representative of a step length or step count of a user of mobile device 200.

In a step 305, a venue associated with the identifier contained in or represented by the at least one radio signal is determined or caused to be determined by mobile device 200 at least partially based on a plurality of venue information items. Therein, causing determining the venue associated with the identifier contained in or represented by the at least one radio signal may be understood to mean that mobile device 200 causes another device (e.g. a server) to perform the determining, for example by transmitting control information to the other device configured to cause the other device to perform the determining. For exemplary purposes, it is however assumed in the following that mobile device 200 performs the determining in step 305.

For example, the plurality of venue information items is part of a point of interest (POI) database. In the following it is assumed that such a POI database is stored in program memory 202 of mobile device 200 and comprises a plurality of POI data items which correspond to the plurality of venue information items. Each POI data item of the plurality of POI data items may be associated with a respective venue or POI like newspaper kiosk 101, coffee shop 102 and clothes shop 103 and represent information about the respective POI like a name, a geographic position, a type, opening hours, a visit frequency, contact details (e.g. address, phone number, website address, email address, etc.), a layout of the POI. In the following, it is assumed that each POI data item of the plurality of POI data items represents at least a name and a layout of the respective POI or venue associated with the respective POI data item. An example data format for such a POI data item is the JavaScript Object Notation (JSON) data format or the Extensible Markup Language (XML) data format.

The determining in step 305 may be understood to mean (1) that a match is determined between the BSSID contained in or represented by WLAN radio signal 108 (e.g. as represented by the identifier information obtained for WLAN radio signal 108 as result of the extracting in step 303) and a respective name represented by a respective POI data item of the plurality of POI data items and (2) that the venue or POI which is associated with the POI data item of the plurality of POI data items representing the matching name is determined to be associated with the BSSID contained in or represented by WLAN radio signal 108. For example, the match between the BSSID contained in or represented by WLAN radio signal 108 and the respective name represented by the re respective POI data item of the plurality of POI data items may be determined based on predetermined rules like a predetermined matching algorithm, for example a string searching algorithm or an approximate string matching algorithm. As disclosed above, according to a simple matching algorithm that a match may be determined by, firstly, determining, for each name represented by the plurality of POI data items, the respective length of the longest substring contained in the respective name and the BSSID contained in or represented by WLAN radio signal 108 and by, secondly determining the respective name of the respective POI data item of the plurality of POI data items containing the substring having the longest length (i.e. no other substring has a longer length) to match the BSSID. In the following it is assumed that the determining in step 305 is at least partially based on this simple matching algorithm. It is however to be understood that the present invention is not limited to this.

Considering the above example, the plurality of POI data items may comprise, for each of newspaper kiosk 101, coffee shop 102 and clothes shop 103, a respective POI data item. The POI data item associated with newspaper kiosk 101 represents the name "Jim's News", the POI data item associated with coffee shop 102 represents the name "Joe's Coffee Shop", and the POI data item associated with clothes shop 103 represents the name "Clothes & More". As disclosed above, WLAN radio signal 108 contains or represents "Joe's Coffee Shop—WiFi" as BSSID. Considering the three POI data items associated with newspaper kiosk 101, coffee shop 102 and clothes shop 103, respectively, since the name (i.e. "Joe's Coffee Shop") represented by the POI data item associated with coffee shop 102 shares the substring having the longest length (i.e. no other substring has a longer length) with the BSSID (i.e. "Joe's Coffee Shop—WiFi") contained in or represented by WLAN radio signal 108, a match between both is determined according to this simple matching algorithm. Accordingly, coffee shop 102 is determined to be associated with the BSSID contained in or represented by WLAN radio signal 108 in step 305.

In a step 306, a position estimate of the observation position is determined or caused to be determined by mobile device 200 at least partially based on layout information representing a layout of the venue associated with the identifier. Therein, causing determining the position estimate of the observation position may be understood to mean that mobile device 200 causes another device (e.g. a server) to perform the determining, for example by transmitting control information to the other device configured to cause the other device to perform the determining. For exemplary purposes, it is however assumed in the following that mobile device 200 performs the determining in step 306.

Figure 4:
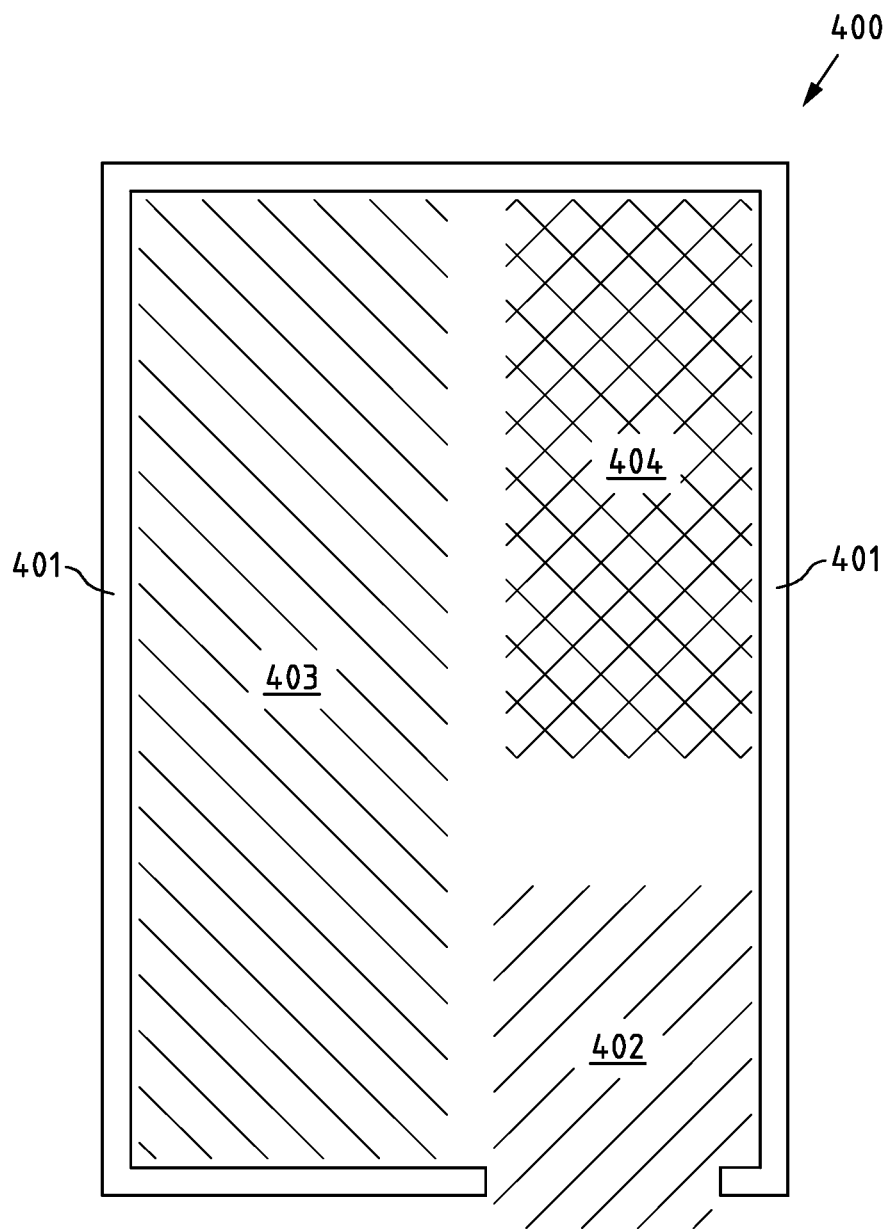
FIG. 4 is a an exemplary embodiment of a layout of a venue according to the invention.

The layout of the venue may be understood to be representative of a position (e.g. a geographic position) of at least one of a certain area (e.g. an entrance or exit area or a common area like a seating area, a waiting area, a walking area or a service or sales area) or a certain feature (e.g. outer boundaries or walls, an entrance or an exit) of the venue. An exemplary embodiment of a layout 400 of coffee shop 102 is shown in FIG. 4. Layout 400 is a floor map of coffee shop 102 and represents the position of outer walls or outer boundaries 401, the position of an exit or entrance area 402, the position of a seating area 403 and the position of a service area 404 of coffee shop 102. For example, the POI data item associated with coffee shop 102 comprises layout information representing layout 400.

The layout information representing layout 400 are considered when determining when determining the position estimate of the observation position in step 306. This may be understood to mean that a position of at least one of a certain area or a certain feature represented by layout 400 may be determined as position estimate of the observation position in step 306. To this end, it may be determined based on predetermined rules in which area or close to which feature of the venue the observation position of the mobile device is located. As disclosed above, this determining may for example be based on further information like information on whether the at least one radio signal (i.e. WLAN radio signal 108) is received for the first time, a motion of mobile device 200, a received signal strength or a combination thereof. For exemplary purposes, it is described in the following how the determining in step 306 may be based on the motion of mobile device 200 captured in optional step 304 (as represented by a motion parameter represented by motion information obtained as a result of the capturing in step 304). It is however to be understood that the invention is not limited to this.

For example the predetermined rules may specify that, if the motion parameter represented by motion information obtained as a result of the capturing in step 304 is characteristic that mobile device 200 is/was in motion (e.g. a user carrying mobile device 200 is/was walking or running or a speed value is greater than 0.1 m/s) when the motion is/was captured in step 304, the position estimate of the observation position may be determined to be a position of an entrance or exit area or a walking area of the venue or POI like entrance or exit area 402; and, if the motion parameter represented by motion information obtained as a result of the capturing in step 304 is characteristic that mobile device 200 is/was static (e.g. a user carrying mobile device 200 is/was sitting or a speed value of mobile device is equal to or less than 0.1 m/s) when the motion is/was captured in step 304, the position estimate of the observation position may be determined to be a position of a seating area or a waiting area of the venue like seating area 403.

In the exemplary scenario of FIG. 1, the user carrying mobile device 200 may for example sit at a table in seating area 403 such that the motion parameter represented by motion information obtained as a result of the capturing in step 304 is characteristic that mobile device 200 is/was static (e.g. a user carrying mobile device 200 is/was sitting or a speed value of mobile device is equal to or less than 0.1 m/s) when the motion is/was captured in step 304. Accordingly, the position estimate of the observation position may be determined to correspond to seating area 403 in step 306. The position estimate may for example be represented in form of position coordinates (e.g. geographic position coordinates like longitude and latitude) representing (1) one or more boundary points of seating area 403 or (2) a center of seating area 403.

Subsequently, the position estimate of the observation position may be presented by user interface 206. If user interface 206 is a display, the position estimate may for example be displayed as a point corresponding to the center of seating area 403 or as an area corresponding to seating area 403 in a map view displayed on user interface 206.

Figure 5:
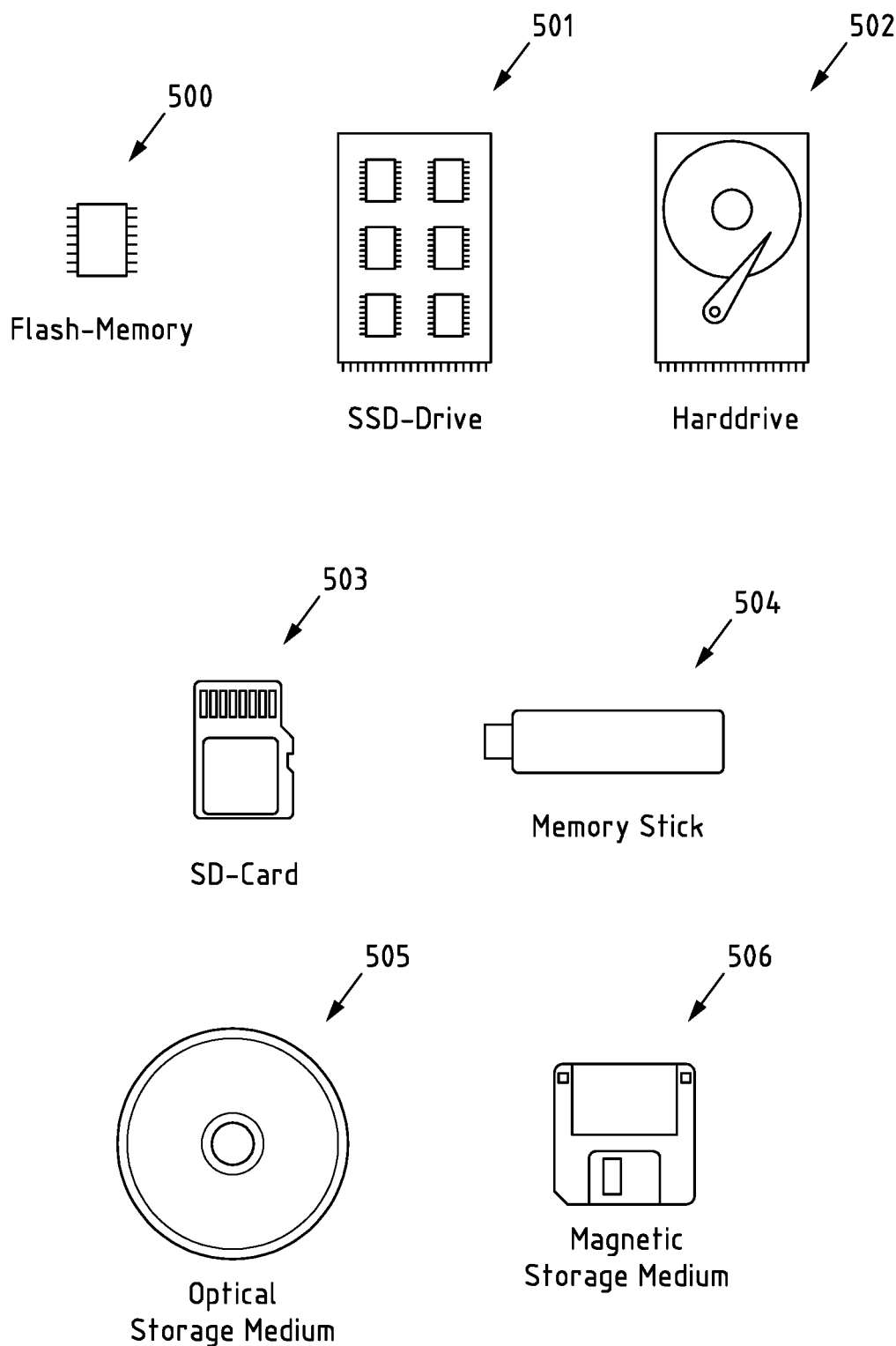
FIG. 5 is a schematic illustration of examples of tangible and non-transitory storage media according to the invention.

FIG. 5 is a schematic illustration of examples of tangible and non-transitory computer-readable storage media according to the present invention that may for instance be used to implement memory 202 of FIG. 1. To this end, FIG. 5 displays a flash memory 500, which may for instance be soldered or bonded to a printed circuit board, a solid-state drive 501 comprising a plurality of memory chips (e.g. Flash memory chips), a magnetic hard drive 502, a Secure Digital (SD) card 503, a Universal Serial Bus (USB) memory stick 504, an optical storage medium 505 (such as for instance a CD-ROM or DVD) and a magnetic storage medium 506.

Any presented connection in the described embodiments is to be understood in a way that the involved components are operationally coupled. Thus, the connections can be direct or indirect with any number or combination of intervening elements, and there may be merely a functional relationship between the components.

Any of the processors mentioned in this text, in particular but not limited to processor 201 of FIG. 2 could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Moreover, any of the actions or steps described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as processors, FPGAs, ASICs, signal processing devices, and other devices.

The wording "A, or B, or C, or a combination thereof" or "at least one of A, B and C" or "at least one of A, B or C" may be understood to be not exhaustive and to include at least the following: (1) A, or (2) B, or (3) C, or (4) A and B, or (5) A and C, or (6) B and C, or (7) A and B and C.

It will be understood that all presented embodiments are only exemplary, and that any feature presented for a particular exemplary embodiment may be used with any aspect of the invention on its own or in combination with any feature presented for the same or another particular exemplary embodiment and/or in combination with any other feature not mentioned. It will further be understood that any feature presented for an example embodiment in a particular category may also be used in a corresponding manner in an example embodiment of any other category.

That which is claimed:

1. An apparatus, said apparatus is one of a mobile device or a module for a mobile device, and said apparatus comprising at least one processor and at least one memory containing computer program code, said at least one memory and said computer program code configured to, with said at least one processor, cause said apparatus at least to perform:

receiving at least one radio signal when scanning for observable radio signals at an observation position of said mobile device;

determining or causing determining a venue associated with an identifier contained in or represented by said at least one radio signal at least partially based on a plurality of venue information items;

determining or causing determining a position estimate of said observation position at least partially based on layout information representing a layout of said venue associated with said identifier; and determining a confidence level associated with said position estimate at least partially based on a venue information item of said plurality of venue information items, and wherein the confidence level is decreased in response to a time of the position estimate being outside of operation hours for the venue associated with the identifier.

2. The apparatus according to claim 1, said at least one memory and said computer program code further configured to, with said at least one processor, cause said apparatus at least to perform:
   extracting said identifier from said at least one radio signal.

3. The apparatus according to claim 1, wherein said layout of said venue is representative of a position of at least one of:
   outer boundaries or outer walls of said venue;
   an entrance or an exit of said venue;
   an entrance or exit area of said venue;
   a seating area of said venue;
   a waiting area of said venue;
   a walking area of said venue; or
   a service or sales area of said venue.

4. The apparatus according to claim 1, wherein said at least one radio signal is one of:
   a Bluetooth radio signal;
   a wireless local area network radio signal;
   a low-power wide-area network radio signal; or
   a cellular radio signal.

5. The apparatus according to claim 1, wherein said identifier of said at least one radio signal is one of:
   a protocol data unit, in particular a protocol data unit according to according to a Bluetooth specification;
   a universally unique identifier;
   a service set identifier;
   a basic service set identifier; or
   a cell identifier.

6. The apparatus of claim 1, wherein determining or causing determining a position estimate of said observation position at least partially based on layout information representing a layout of said venue associated with said identifier comprises causing said apparatus to at least perform:
   determining or causing determining of a degree of motion of said mobile device;
   determining a position estimate of a walking area of the venue, an entrance area of the venue, or an exit area of the venue in response to the degree of motion of said mobile device being above a predefined value; and
   determining a position estimate of a seating area of the venue or a waiting area of the venue in response to the degree of motion of said mobile device being below the predefined value.

7. A method performed by a mobile device, said method comprising:
   receiving at least one radio signal when scanning for observable radio signals at an observation position of said mobile device;
   determining or causing determining a venue associated with an identifier contained in or represented by said at least one radio signal at least partially based on a plurality of venue information items;
   determining or causing determining a position estimate of said observation position at least partially based on layout information representing a layout of said venue associated with said identifier; and
   determining a confidence level associated with said position estimate at least partially based on a venue information item of said plurality of venue information items, and wherein the confidence level is decreased in response to a time of the position estimate being outside of operation hours for the venue associated with the identifier.

8. The method according to claim 7, said method comprising at least one of:
   extracting said identifier from said at least one radio signal;
   capturing a received signal strength of said at least one radio signal when scanning for observable radio signals at said observation position; and
   capturing a motion of said mobile device.

9. The method according to claim 7, wherein said layout of said venue is representative of a position of at least one of:
   outer boundaries or outer walls of said venue;
   an entrance or an exit of said venue;
   an entrance or exit area of said venue;
   a seating area of said venue;
   a waiting area of said venue;
   a walking area of said venue; or
   a service or sales area of said venue.

10. The method according to claim 7, wherein said at least one radio signal is one of:
    a Bluetooth radio signal;
    a wireless local area network radio signal;
    a low-power wide-area network radio signal; or
    a cellular radio signal.

11. The method according to claim 7, wherein said identifier of said at least one radio signal is one of:
    a protocol data unit, in particular a protocol data unit according to according to a Bluetooth specification;
    a universally unique identifier;
    a service set identifier;
    a basic service set identifier; or
    a cell identifier.

12. The method of claim 7, wherein determining or causing determining a position estimate of said observation position at least partially based on layout information representing a layout of said venue associated with said identifier comprises:
    determining or causing determining of a degree of motion of said mobile device;
    determining a position estimate of a walking area of the venue, an entrance area of the venue, or an exit area of the venue in response to the degree of motion of said mobile device being above a predefined value; and
    determining a position estimate of a seating area of the venue or a waiting area of the venue in response to the degree of motion of said mobile device being below the predefined value.

13. A non-transitory computer readable storage medium in which computer program code is stored, the computer program code when executed by a processor causing at least one apparatus, said at least one apparatus is one of a mobile device or a module for a mobile device, to perform:

receiving at least one radio signal when scanning for observable radio signals at an observation position of said mobile device;

determining or causing determining a venue associated with an identifier contained in or represented by said at least one radio signal at least partially based on a plurality of venue information items;

determining or causing determining of a degree of motion of said mobile device;

determining or causing determining a position estimate of said observation position at least partially based on layout information representing a layout of said venue associated with said identifier, wherein determining or causing determining a position estimate of said observation position at least partially based on a layout of said venue associated with said identifier comprises:

determining a position estimate of a walking area of the venue, an entrance area of the venue, or an exit area of the venue in response to the degree of motion of said mobile device being above a predefined value; and determining a position estimate of a seating area of the venue or a waiting area of the venue in response to the degree of motion of said mobile device being below the predefined value.

14. The non-transitory computer readable storage medium according to claim 13, said computer program code when executed by a processor causing said at least one apparatus to further perform at least one of:

extracting said identifier from said at least one radio signal;

capturing a received signal strength of said at least one radio signal when scanning for observable radio signals at said observation position; and capturing a motion of said mobile device.

15. The non-transitory computer readable storage medium according to claim 13, wherein said computer program code, when executed by the processor causes the at least one apparatus to at least to perform:

determining a confidence level associated with said position estimate at least partially based on a venue information item of said plurality of venue information items, and wherein the confidence level is decreased in response to a time of the position estimate being outside of operation hours for the venue associated with the identifier.

16. The computer program product according to claim 13, wherein said identifier of said at least one radio signal is one of:

a protocol data unit, in particular a protocol data unit according to a Bluetooth specification;

a universally unique identifier;
a service set identifier;
a basic service set identifier; or
a cell identifier.

17. A method performed by a mobile device, said method comprising:

receiving at least one radio signal when scanning for observable radio signals at an observation position of said mobile device;

determining or causing determining a venue associated with an identifier contained in or represented by said at least one radio signal at least partially based on a plurality of venue information items;

determining or causing determining of a degree of motion of said mobile device;

determining or causing determining a position estimate of said observation position at least partially based on layout information representing a layout of said venue associated with said identifier, wherein determining or causing determining a position estimate of said observation position at least partially based on a layout of said venue associated with said identifier comprises:

determining a position estimate of a walking area of the venue, an entrance area of the venue, or an exit area of the venue in response to the degree of motion of said mobile device being above a predefined value; and determining a position estimate of a seating area of the venue or a waiting area of the venue in response to the degree of motion of said mobile device being below the predefined value.

18. The method according to claim 17, further comprising extracting said identifier from said at least one radio signal.

19. The method according to claim 17, wherein said at least one radio signal is one of:

a Bluetooth radio signal;
a wireless local area network radio signal;
a low-power wide-area network radio signal; or
a cellular radio signal.

20. The method according to claim 17, wherein said identifier of said at least one radio signal is one of:

a protocol data unit, in particular a protocol data unit according to a Bluetooth specification;
a universally unique identifier;
a service set identifier;
a basic service set identifier; or
a cell identifier.

* * * * *